United States Patent

Tohgi et al.

[11] Patent Number: 6,031,171
[45] Date of Patent: Feb. 29, 2000

[54] PERFORMANCE DATA ANALYZER

[75] Inventors: Yutaka Tohgi; Yoshiko Fukushima, both of Hamamatsu, Japan

[73] Assignee: Yamaha Corporation, Japan

[21] Appl. No.: 08/678,760

[22] Filed: Jul. 11, 1996

[30] Foreign Application Priority Data

| Jul. 11, 1995 | [JP] | Japan | 7-175248 |
| Jul. 11, 1995 | [JP] | Japan | 7-175249 |
| Jul. 11, 1995 | [JP] | Japan | 7-175250 |

[51] Int. Cl.[7] .............. G09B 15/00; G10H 1/38
[52] U.S. Cl. .......... 84/470 R; 84/613; 84/650; 84/709; 84/DIG. 22
[58] Field of Search .............. 84/454, 470 R, 84/613, 637, 650–652, 669, DIG. 22, 709

[56] References Cited

U.S. PATENT DOCUMENTS 4,951,544  8/1990  Minamitaka ............... 84/613
5,183,398  2/1993  Monte et al. ............... 84/470 R
5,670,731  9/1997  Imaizumi ................... 84/613

FOREIGN PATENT DOCUMENTS 63-316090  12/1988  Japan.
1-89934     6/1989  Japan.
6-124088    5/1994  Japan.

*Primary Examiner*—Stanley J. Witkowski
*Attorney, Agent, or Firm*—Rossi & Associates

[57] ABSTRACT

A performance data analyzer wherein a plurality of pitch name lines each comprised of essential pitch names characterizing each of plural tonalities are memorized and wherein one of the memorized pitch name lines at least a portion of which is included in an input performance data is extracted and a harmonic tone is extracted from the input performance data so that a tonality of the input performance data is detected on a basis of the extracted pitch name line and the extracted harmonic tone.

15 Claims, 17 Drawing Sheets

MELODY DATA

SECTION ANALYSIS DATA

Fig.4A
Fig.4B
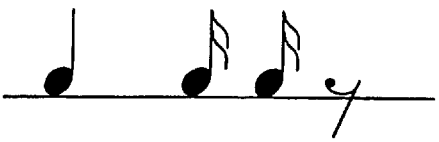
Fig.4C
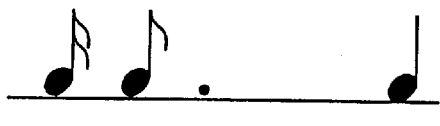

PERFORMANCE DATA ANALYZER

BACKGROUND OF THE INVENTION

1. Field of the Invention

The present invention relates to an apparatus for analyzing performance data in an electronic musical instrument, a microproccessed musical apparatus or the like, and more particularly to a performance data analyzer for detecting a tonality from melody information corresponding with notes of performance data.

2.

To arrange a melody or performance data created by an electronic musical instrument or a microprocessed musical apparatus, it is required to detect a tonality of the performance data. Although there has been proposed a detecting method wherein a final tone of a melody is deemed as a tonic to detect a tonality of the melody, the tonality may not be modulated in the middle of the melody but also change of the tonality may not be detected in detail for determination of a chord progression. To solve such problems, there has been proposed a detecting method wherein a melody is divided into blocks of a predetermined length such musical phrases to detect each tonality of the blocks. In the detecting method, however, division of the melody itself influences a result of analysis of the performance data. For this reason, the tonality may not be accurately detected.

In detection of the tonality, a harmonic tone in the melody is an important element useful for analysis of the performance data. It is, however, difficult to determine the harmonic tone from the melody. For this reason, it is needed to provide a method for detecting the harmonic tone from the melody in a simple manner.

SUMMARY OF THE INVENTION

It is, therefore, a primary object of the present invention to provide a performance data analyzer capable of accurately detecting a tonality from melody information of an input performance data.

A secondary object of the present invention is to provide a performance data analyzer capable of extracting a harmonic tone from melody information of an input performance data in a simple manner.

According to the present invention, the primary object is accomplished by providing a performance data analyzer which comprises comprising input means for inputting a performance data representing a sequence of plural notes, memory means for memorizing a plurality of pitch name lines each comprised of essential pitch names characterizing each of plural tonalities, extraction means for extracting one of the memorized pitch name lines at least a portion of which is included in the input performance data and detection means for detecting a tonality of the input performance data based on the extracted pitch name line.

According to an aspect of the present invention, there is provided a performance data analyzer which comprises input means for inputting a performance data representing a sequence of plural notes, memory means for memorizing a plurality of pitch name lines each comprised of essential pitch names characterizing each of plural tonalities, first extraction means for extracting one of the memorized pitch name lines at least a portion of which is included in the input performance data, second extraction means for extracting a harmonic tone from the input performance data, and detection means for detecting a tonality of the input performance data based on the extracted pitch name line and the extracted harmonic tone.

According to another aspect of the present invention, there is provided a performance data analyzer which comprises input means for inputting a performance data representing a sequence of plural notes, means for dividing the input performance data into a plurality of predetermined sections, memory means for memorizing a plurality of pitch name lines each comprised of essential pitch names characterizing each of plural tonalities, extraction means for extracting one of the memorized pitch name lines at least a portion of which is included in plural pitch names of each of the divided sections of the input performance data, and detection means for detecting each tonality of the divided sections of the input performance data based on the extracted pitch name line.

According to the present invention, the secondary object is accomplished by providing a performance data analyzer which comprises input means for inputting a performance data representing a sequence of plural notes, first detection means for detecting an auxiliary pattern from the input performance data, and determination means for determining one of tones included in the detected auxiliary pattern as a harmonic tone, for determining each of the remaining tones in the auxiliary pattern as a non-harmonic tone and for determining a portion of the input performance data in a predetermined interval relationship with the determined harmonic tone as a harmonic tone.

BRIEF DESCRIPTION OF THE DRAWINGS

Other objects, features and advantages of the present invention will be more readily appreciated from the following detailed description of preferred embodiments thereof when taken together with the accompanying drawings, in which:

FIGS. 4A–4C illustrate a special pattern of two beats length adapted to the performance data analyzer;

DESCRIPTION OF PREFERRED EMBODIMENTS

Figure 2:
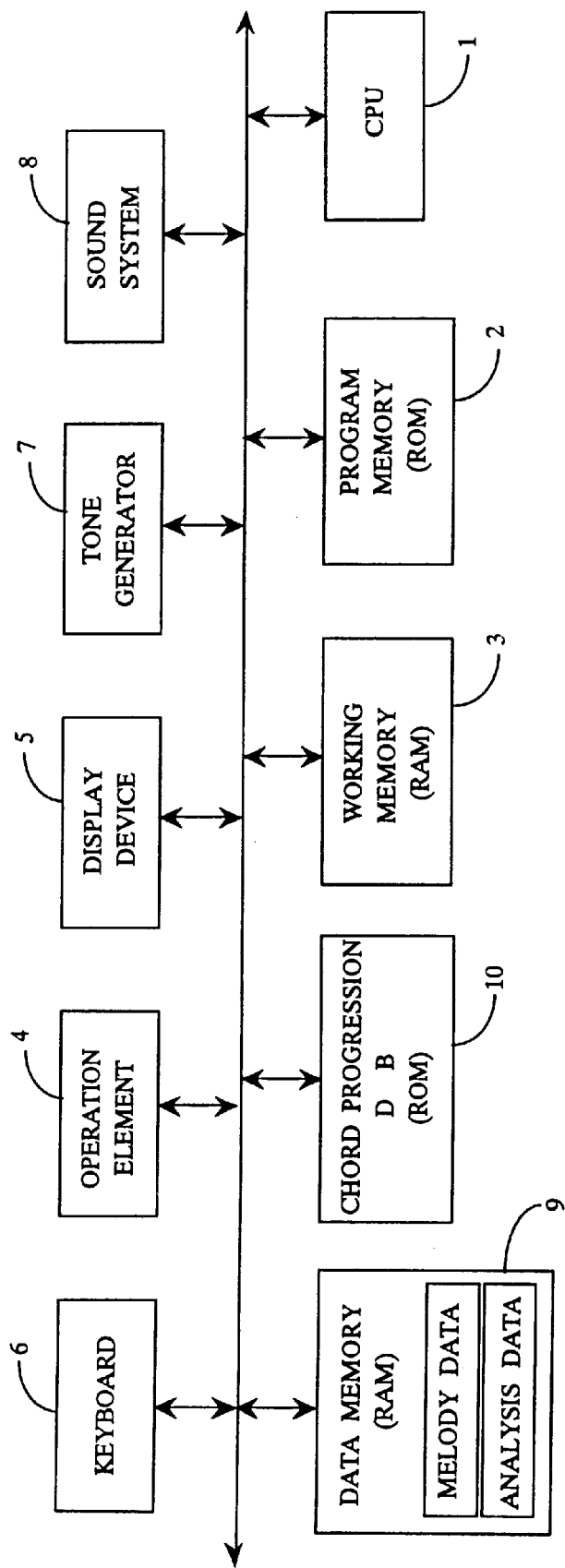
FIG. 2 is a block diagram of an electronic musical instrument provided with a performance data analyzer according to the present invention.

Illustrated in FIG. 2 of the drawings is a block diagram of an electronic musical instrument provided with a performance data analyzer according to the present invention. The electronic musical instrument includes a central processing unit or CPU 1 programmed to execute a control program stored in a program memory 2 by using a working area in a working memory 3 for control of the entirety of the musical instrument. The CPU 1 is operated at a normal mode or a melody analyzing mode by manipulation of an operation element 4 such as a panel switch and a display device 5.

At the normal mode, the CPU 1 reads out a key-code, a touch data, a key-on or key-off signal in accordance with a key-event of a keyboard 6 and applies the key-code with a note-on or note-off signal to a tone generator 7 to effect sound processing or mute processing in response to the keyboard performance. The tone generator 7 is designed to produce a musical tone signal in accordance with the applied data. A sound system 8 is connected to the tone generator 7 to effect digital to analog conversion of the musical tone signal for generating a musical sound.

At the melody analyzing mode, the CPU 1 reads out a key-code, a touch data, a key-on or key-off signal in response to a key-event of the keyboard 6 to produce performance data based thereon. The processing for production of the performance data is effected at a real-time record mode where the performance data is produced by normal performance operation of the keyboard 6 or at a step-record mode where the performance data is produced by operation of the keyboard 6 and operation element 4.

When applied with the performance data, the CPU 1 corrects irregularity of the input tone length to produce a tone length data indicative of each length of notes and causes a data memory 9 in the form of a random access memory or RAM to memorize a melody data comprised of a tone pitch data, a tone length data, a rest data and a rest length data. When the melody data is memorized in the data memory 9, the CPU 1 analyzes the memorized melody data and causes the data memory 9 to memorize an analyzed data comprised of a section analysis data, a tonality data and a chord.

Figure 3A:
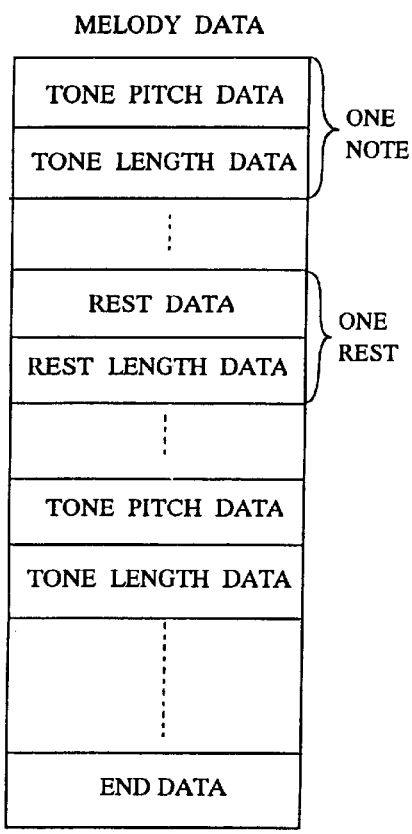
FIG. 3A is a format of a melody data applied to the performance data analyzer shown in FIG. 2.
Figure 3B:
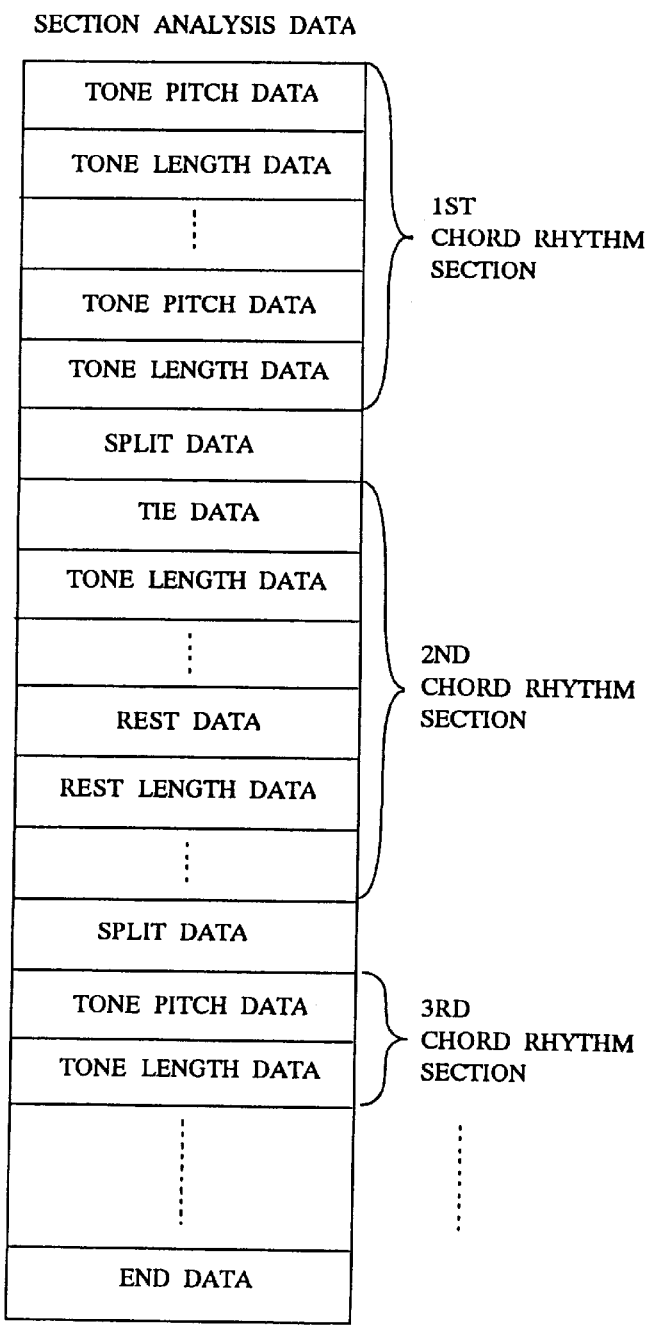
FIG. 3B is a format of a section analysis data applied to the performance data analyzer.

Illustrated in FIGS. 3A and 3B is each format of the melody data and the section analysis data in the analyzed data in the melody data shown in FIG. 3A, one note is represented by a tone pitch data and a tone length data, and one rest is represented by a rest data and a rest length data. The tone pitch data is represented by a key-code, and the rest data is represented by a predetermined identification code. The tone length data and rest length data are represented by length of a time defined by a predetermined number of clocks (for instance, a quarter note divided into twenty four pieces).

Although an actual sound time becomes different when the same note is played by slur or staccato, the tone length data and rest length data are defined by the number of clocks regardlessly of the actual sound time. Accordingly, a position of a measure is detected by adding the tone length data and rest length data from the head of the melody data. The melody data can be retrieved at each unit of a measure and a phrase.

The section analysis data shown in FIG. 3B is obtained by dividing the melody data into chord rhythm sections based on a result of analysis of the melody. Thus, the section analysis data is memorized in the form of a format where a split data indicative of each boundary of the respective chord rhythm sections is inserted into the melody data shown in FIG. 3A. In addition, an ending data is memorized in each final part of the melody data and the section analysis data.

Figure 1:
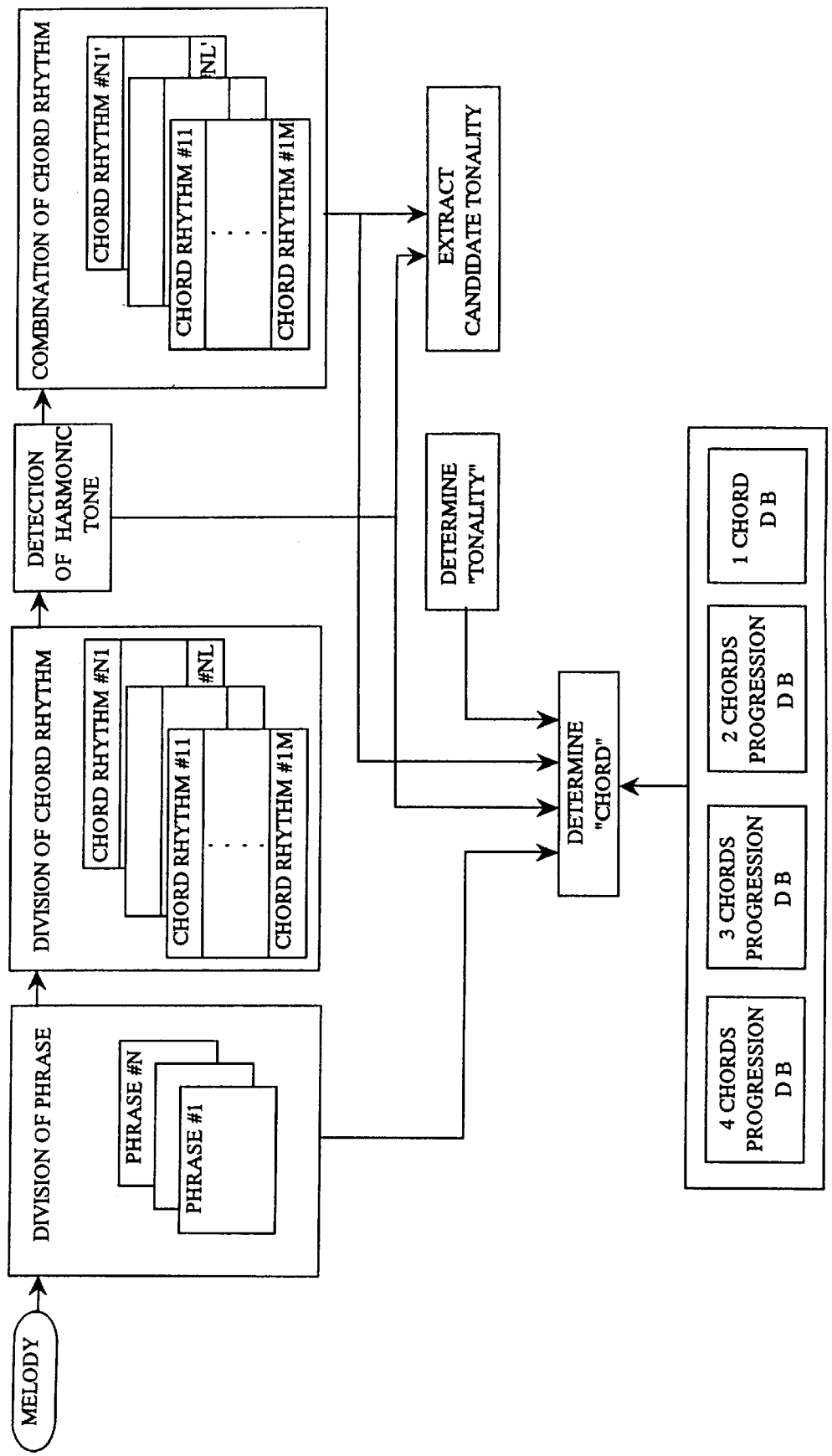
FIG. 1 is a conceptional view illustrating a flow of melody analysis in a preferred embodiment of the present invention.

In FIG. 1 there is illustrated a flow of the melody analysis in this embodiment. The melody data memorized in the data memory 9 is first divided into phrases (#1–#N) each as a unit section of a predetermined length and is further divided into chord rhythms (#11–#1M, . . . , #N1–#NL) each in the form of one measure or a half note smaller than each of the divided phrases. The chord rhythm sections are adapted as a unit section for determining a chord in a chord progression. The dividing method of the melody data is determined in accordance with the feature of the melody as will be described later. Subsequently, a harmonic tone is extracted from the respective rhythm sections, and chord rhythms (#11–#1M', . . . , #N1–#NL') are applied to the extracted harmonic tone to provide a section for detection of a tonality. Thus, a harmonic tone and a pitch name are extracted at each detecting section of the chord rhythms to extract a candidate tonality based thereon.

As shown in the following table, the program memory 2 memorizes pitch name lines comprised of essential pitch names characterizing each tonality in accordance with a scale in the form of a scale-tone line table with degrees such as I, II, III, IV. To extract a candidate tonality from the harmonic tone and pitch name lines, the CPU 1 retrieves a scale-tone line of a detecting section from the scale-tone line table and detects a tonality of the scale including the retrieved scale-tone line and a harmonic tone of the detecting section as the candidate tonality. Then, the CPU 1 determines a tonality of the detecting section from the candidate tonality.

TABLE 1

| SCALE-TONE LINE TABLE | | | | |
| --- | --- | --- | --- | --- |
| SCALE-TONE LINE 1 | I | II | III | IV |
| SCALE-TONE LINE 2 | I | V | VI | VII |
| SCALE-TONE LINE 3 | I | II | III | IV# |

In this embodiment, a chord of the detecting section is determined from the detecting section divided for detection of the tonality and a harmonic tone of the divided section, and a chord is determined on a basis of a chord progression data memorized in a chord sequence data base DB. In this instance, the CPU 1 determines whether or not a chord to be determined is suitable at a head or an end of the divided phrase and determines a chord in conformity with the chord progression data.

Figure 5:
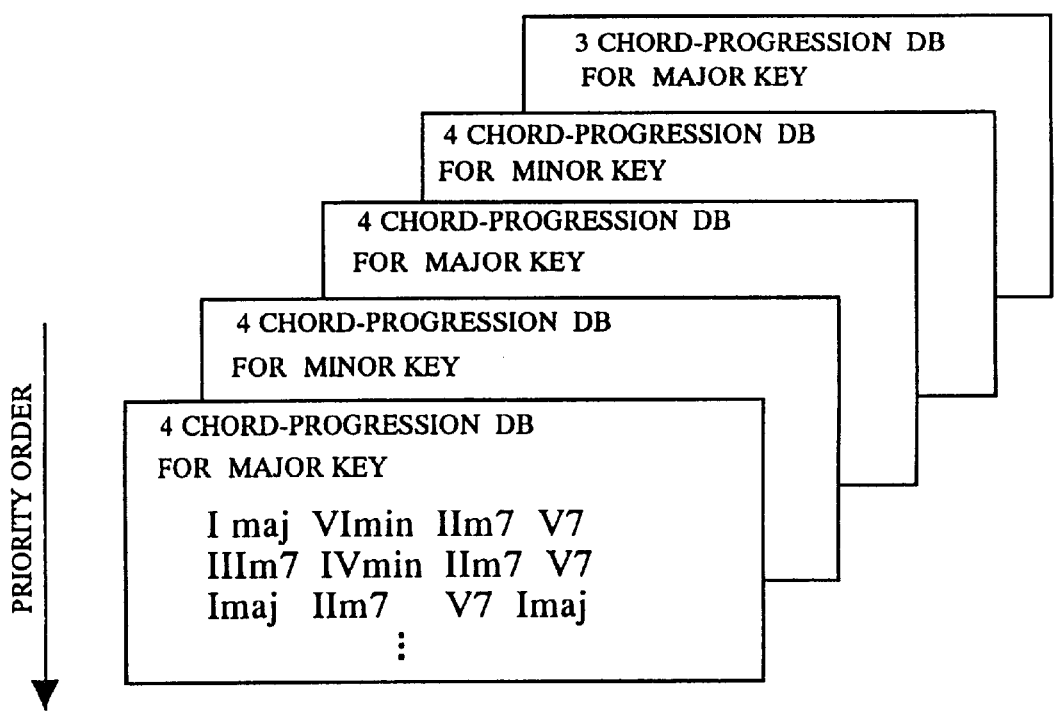
FIG. 5 illustrate a chord progression data applied to the performance data analyzer.

Illustrated in FIG. 5 is an example of chord progression data representing a typical chord progression. The chord progression table includes a four-chords progression DB comprised of four chords, a two-chords progression DB comprised of two chords and a three-chords progression DB comprised of three chords. These chord progression data DB are classified into chord progression data respectively corresponding with a major tonality and a minor tonality. The four-chords progression DB is further classified into a chord progression of the synchronization type where one chord corresponds with one measure and a chord progression of the non-synchronization type where one chord does not correspond with one measure. Each chord of the chord progression data is indicated by a combination of a root (I) and a type (maj) such as Imaj. Since the root is represented by a degree the standard of which is a tonic of a tonality, the chord progression data DB corresponds in common with each tonality of tonics of twelve pitch names (C, C#, D, . . . , B).

The same sort of chord progression data is applied with the order of priority. For example, in the four-chords progression DB for a major key shown in FIG. 5, "Imaj-VImin-IIm7-V7" (Cmaj-Amin-Dm7-G7 in C Major) is highest in the order of priority, and the priority orders of "IIIm7-IVmin-IIm7-V7 (Em7-Fmin-Dm7-G7 in C Major)" and "Imaj-IIm7-V7-Imaj (Cmaj-Dm7-G7-Cmaj in C Major) are lowered in sequence.

Figure 6:
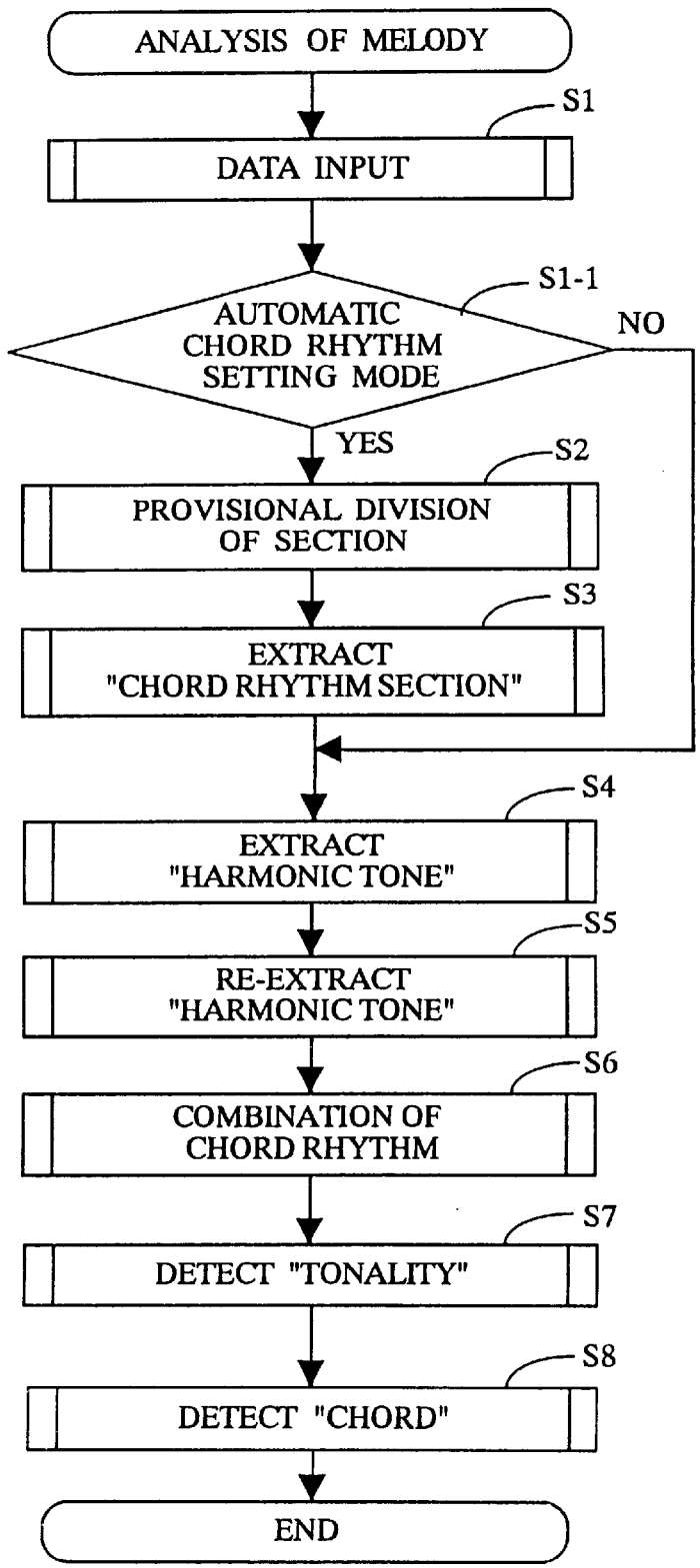
FIG. 6 is a flow chart of a main routine for melody analysis.

A flow chart of a control program at the melody analysis mode is illustrated in FIG. 6, and flow charts of sub-routines of the control program are illustrated in FIGS. 7–17. Hereinafter, operation of the embodiment will be described with reference to the flow charts in FIGS. 6–17.

Figure 7:
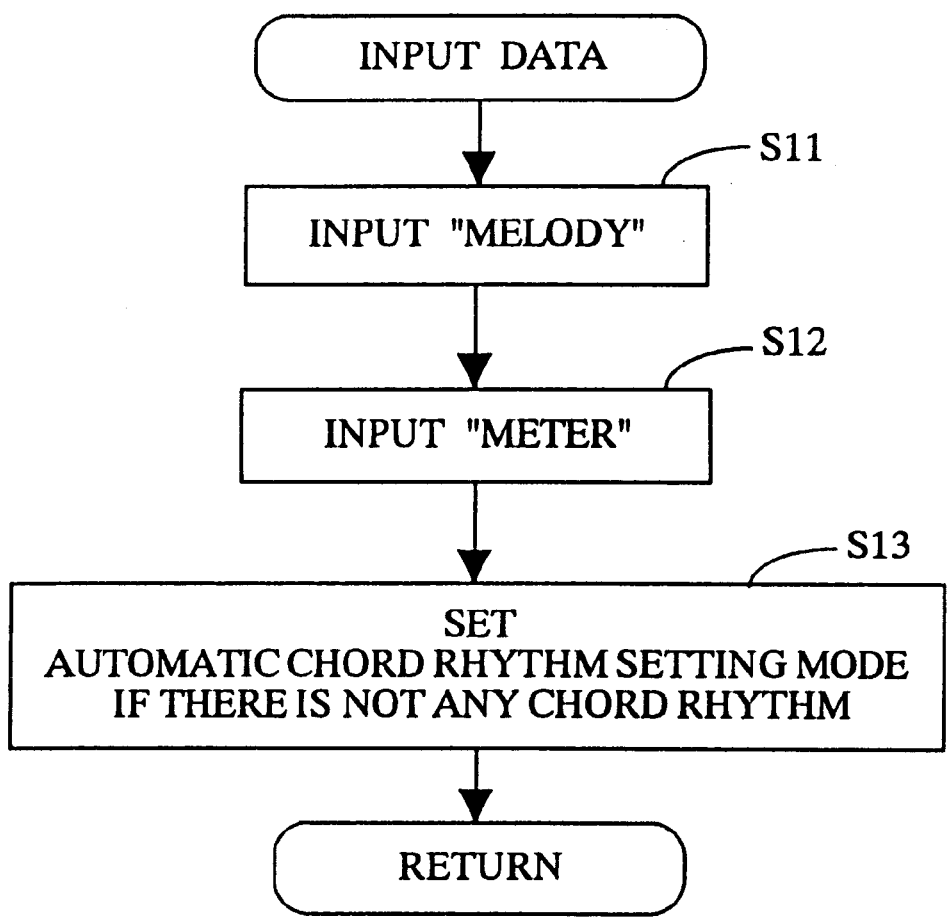
FIG. 7 is a flow chart of a data input routine.

Assuming that a melody analysis mode is designated by operation of the operation element 4, the CPU 1 starts to execute the control program of FIG. 6 and executes at step S1 a data input processing of FIG. 7 to memorize a melody data into the data memory 9. If there is an input of a chord rhythm, the CPU 1 memorizes the chord rhythm in the data memory 9. If there is not any input of chord rhythms, the CPU 1 changes the melody analysis mode to an automatic chord rhythm setting mode. At step S1-1 in FIG. 6, the CPU 1 determines whether the automatic chord rhythm setting mode is selected or not. If the answer at step S1-1 is "Yes", the program proceeds to step S2. If the answer at step S1-1 is "No", the program proceeds to step S4. At step S2, the CPU 1 executes processing for provisional division of the melody data shown in FIG. 8 to divide the melody data into plural phrases. At the following step S3, the CPU 1 executes processing for extraction of a chord rhythm section shown in FIG. 9 to provisionally divide each of the phrases into one or more chord rhythm sections and causes the program to proceed to step S4. Then, the CPU 1 executes at step S4 processing for extraction of a harmonic tone shown in FIG. 10 and executes at step S5 processing for re-extraction of the harmonic tone shown in FIG. 13 to extract a harmonic tone. Subsequently, the CPU 1 executes at step S6 processing for combination of the chord rhythms shown in FIG. 14 to finally determine each chord rhythm section for detection of a tonality and executes at step S7 processing for detection of a tonality shown in FIG. 15 to determine a tonality for each rhythm section. The CPU 1 further executes at step 8 processing for chord detection shown in FIG. 7 to determine a chord.

During processing for data input shown in FIG. 7, the CPU 1 inputs at step S11 a melody produced by performance of the keyboard 6 at step S11 and memorizes the melody data in the data memory 9. At the following step S12, the CPU 1 determines a meter data such as a 4/4 meter or a 3/4 meter designated by manipulation of the operation element 4. If any chord rhythm section is not designated by manipulation of the operation element 4, the CPU 1 sets an automatic chord rhythm setting mode at step S13 to automatically set a chord rhythm section. If a chord rhythm section is designated by manipulation of the operation element 4, the CPU 1 memorizes a period of the designated chord rhythm section.

Figure 8:
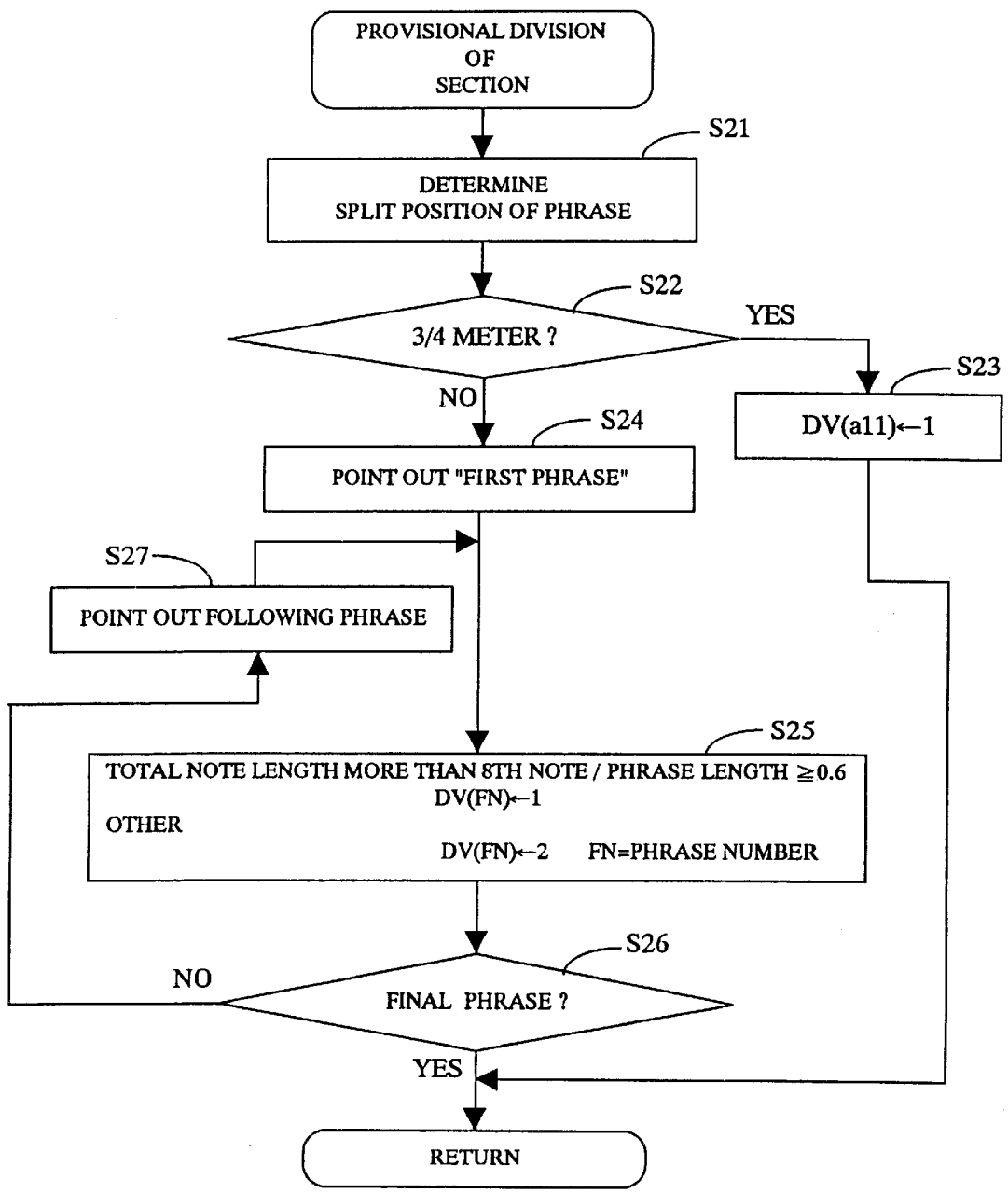
FIG. 8 is a flow chart of a sub-routine for provisional division of a section.

During processing for provisional division of the melody data shown in FIG. 8, the CPU 1 divides the melody data into phrases in such a manner that if a note longer in length than a half note is present immediately before a measure line, a split position of the phrases is determined by the measure line and that when each of the phrases becomes more than four measures, a split position of the phrases is determined by a position of a measure line placed at the fourth measure from the first measure. In this instance, the CPU 1 memorizes the split position of the phrases by inserting a split data of phrases different from the chord rhythm into the melody data in the same manner as in the case of FIG. 3B.

Figure 9:
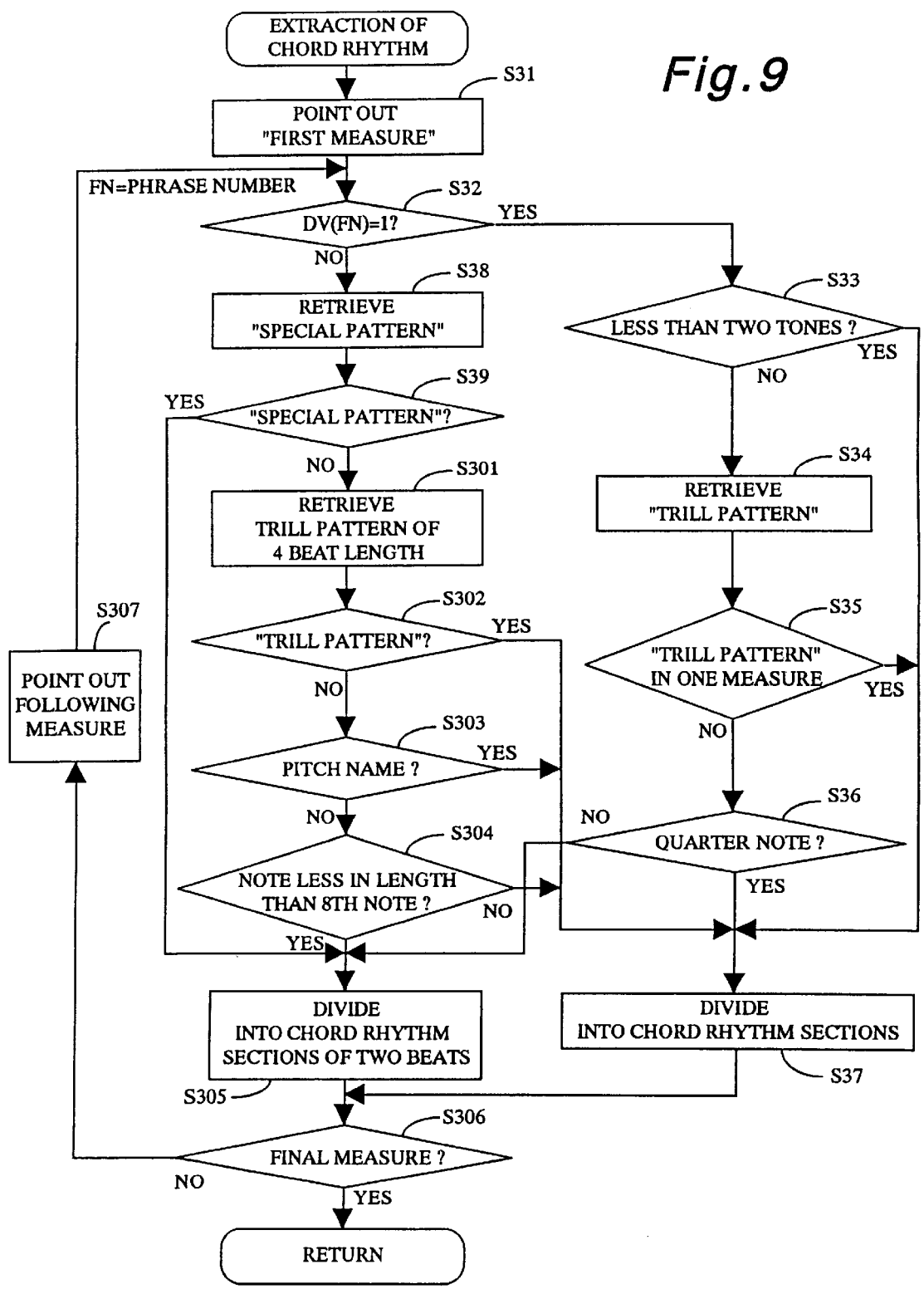
FIG. 9 is a flow chart of a sub-routine for extraction of a chord rhythm section.

During processing for extraction of a chord rhythm shown in FIG. 9, the memorized phrases each are further provisionally divided into each chord rhythm section of one measure or two beats in accordance with the melody pattern. In this instance, the detecting condition of the melody pattern is switched over in accordance with the note density of the respective phrases. During the following processing, a flag DV(FN) corresponding with each phrase is set as "1" when the note density is low and is set "2" when the note density is high.

At step S22, the CPU 1 determines whether the present meter is a 3/4 meter or not. If the answer at step S22 is "Yes", the program proceeds to step S23 where the CPU 1 sets all the flags DV(all) corresponding with all the phrases respectively as "1" and returns the program to the main routine. If the answer at step S22 is "No", the program proceeds to step S24 where the CPU 1 causes a reading pointer in the data memory 9 to point out a first phrase and causes the program to proceed to step S25. At step S25, the CPU 1 determines whether or not a ratio of total note length of notes more than eighth note to the phrase length is more than 0.6. If the answer at step S25 is "Yes", the CPU 1 the flag DV(FN) as "1". If the answer at step S25 is "No", the CPU 1 sets the flag DV(FN) as "2". Thereafter, the CPU 1 determines at step S26 whether the present phrase is a final one or not. If the answer at step S26 is "No", the CPU 1 causes the reading pointer at step S27 to point out the following phrase and causes the program to proceed to step S25. If the answer at step S26 is "Yes", the CPU 1 returns the program to the main routine.

With the foregoing processing, the note density is regarded as low when the meter is a 3/4 meter or when the ratio of the total length of notes more than eighth note to the phrase length is more than 0.6, while the note density is regarded as high when the ratio of the total length of notes more than eighth note to the phrase length is less than 0.6. Thus, the detecting condition of the melody pattern is switched over in accordance with the note density during processing for extraction of the chord rhythm shown in FIG. 9 as described below.

At step S31, the CPU 1 causes the reading pointer to point out a first measure and determines at step S32 whether the flag DV(FN) is "1" or not. If the answer at step S32 is "Yes" in low density of the note, the CPU 1 determines at step S33 whether the note in the first measure is less than two tones or not. If the answer at step S33 is "Yes", the CPU 1 divides the phrase into chord rhythm sections of one measure by inserting a split data into the phrase. If the answer at step S33 is "No", the CPU 1 retrieves at step S34 whether a trill pattern is present in the one measure or not. The trill pattern is in the form of a pattern where a note of tone pitches a and b less than one tone in a difference of interval is repeated more than two times.

If the answer at step S35 is "Yes", the CPU 1 divides the trill pattern into chord rhythm sections of the one measure.

If the answer at step S35 is "No", the program proceeds to step S36 where the CPU 1 determines whether all the notes of the one measure each are a quarter note or not. If the answer at step S36 is "Yes", the CPU 1 divides at step S37 all the notes into chord rhythm sections of the one measure. If the answer at step S36 is "No", the CPU 1 further divides the present data of the measure into each chord rhythm section of two beats and causes the program to proceed to step 306.

If the answer at step S32 is "No" in high density of the note, the CPU 1 retrieves at step S39 whether a special pattern respectively shown in FIGS. 4A, 4B, 4C is present in the present measure or not. The special pattern is in the form of a sound timing pattern of two beats length appeared at the second beat from the first beat or the fourth beat from the third beat. In the special pattern, a pattern between the second and third beats is disregarded, and the high frequency two beats are in a group. In this instance, an original melody pattern of the input melody data and a sound timing pattern caused by continuous tones of the same tone pitch are retrieved by the CPU 1. The pattern of FIG. 4A is provided with a condition for successive progression in the same direction. The successive progression is represented by ascending or descending progression with a difference in two tone pitches (whole tone or semitone) between adjacent notes, and the progressive direction is represented by an ascending or descending direction of the tone pitch. The patterns of FIGS. 4B and 4C are defined without any conditions.

If the special pattern is included in the measure, the CPU 1 divides at step S305 the measure into each chord rhythm section of two beats. If the answer at step S39 is "No", the CPU 1 determines at step S302 a trill pattern of four beats length is present in the measure or not. If the answer at step S302 is "Yes", the CPU 1 determines at step S37 the present measure as a chord rhythm section. If the answer at step S302 is "No", the CPU 1 determines at step S303 whether all the notes in the present measure is the same in pitch name or not. If the answer at step S303 is "Yes", the CPU 1 determines the present measure as a chord rhythm section. If the answer at step S303 is "No", the CPU 1 determines at step S304 whether or not there is a note less in length than an eighth note. If the answer at step S304 is "No", the CPU 1 determines at step 37 the present measure as a chord rhythm section. If the answer at step S304 is "Yes", the CPU 1 divides at step S305 the present measure into two chord rhythm sections of two beats.

When the processing of the one measure has finished, the CPU 1 determines at step S306 whether the presently pointed measure is a final measure or not. If the answer at step S306 is "No", the CPU 1 causes the reading pointer at step S307 to point out the following measure and causes the program to proceed to step S32. When the answer at step S306 becomes "Yes", the CPU 1 returns the program to the main routine.

With the foregoing processing, the melody data is divided into a plurality of chord rhythm sections. If in this instance, one of the following conditions is satisfied, one measure is determined as a chord rhythm section of one measure length since any change of the tonality does not occur.

a) a condition where a trill pattern exists in one measure.

b) a condition where all the notes of one measure each are a quarter note.

c) a condition where a trill pattern of four beats length exists in one measure.

d) a condition where all the notes of one measure are the same pitch name.

If one of the following conditions is satisfied in each phrase, one measure is provisionally divided into two chord rhythm sections of two beats.

1) a condition where special patterns of two beats length are in one measure.

2) a condition where a long trill pattern does not in one measure.

3) a condition where pitch names of respective notes are dispersed in one measure.

Figure 10:
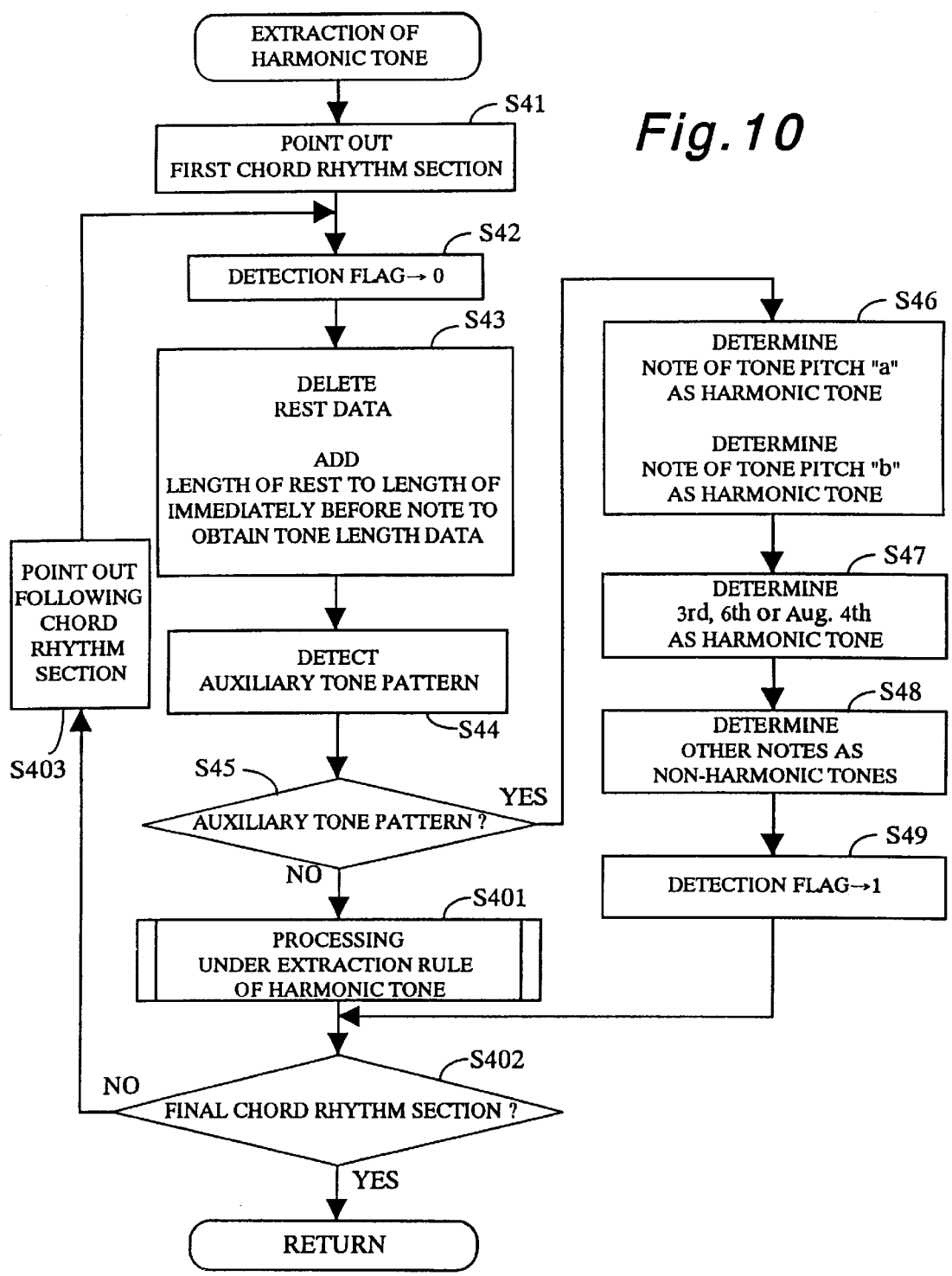
FIG. 10 is a flow chart of a sub-routine for extraction of a harmonic tone.
Figure 11:
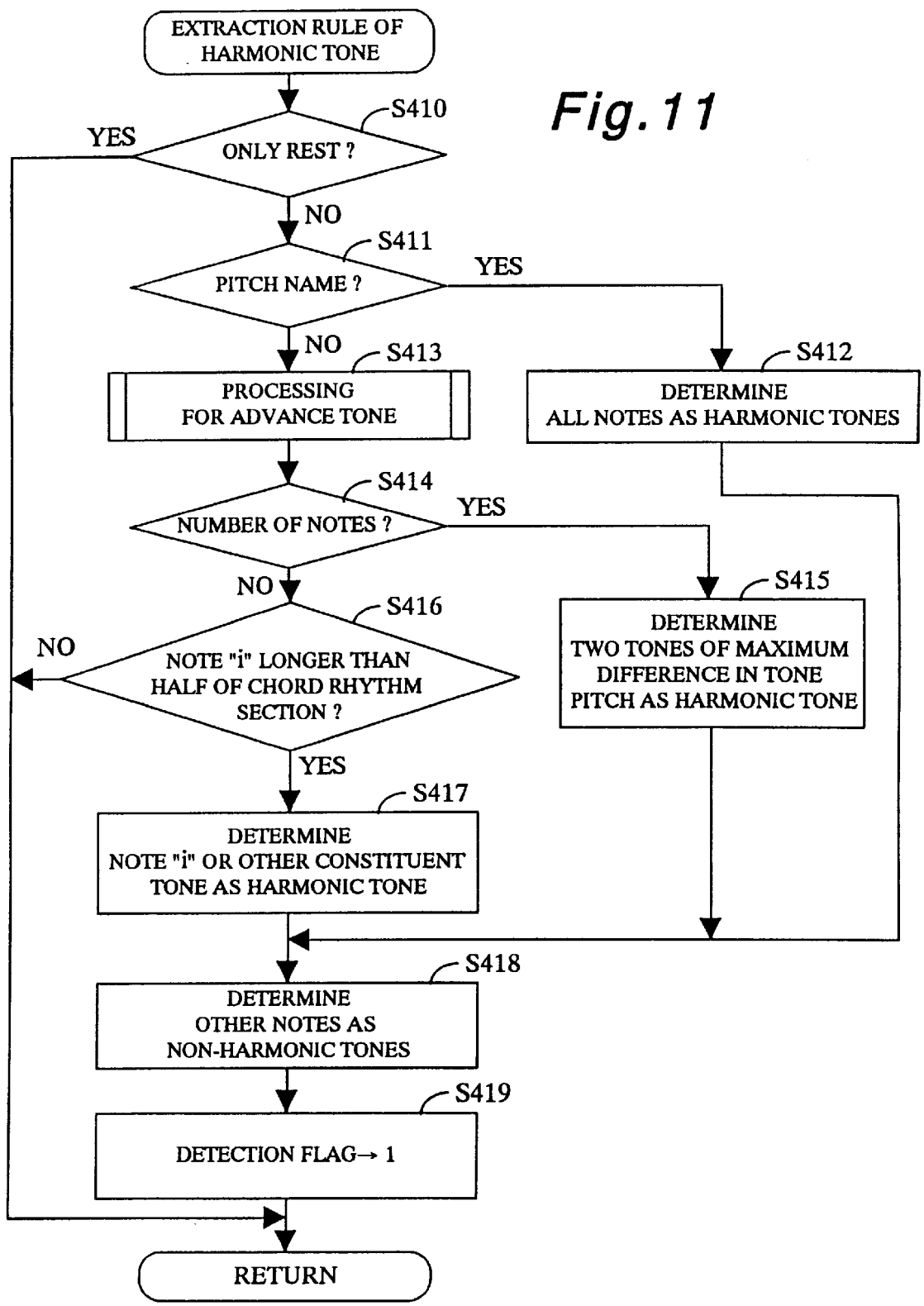
FIG. 11 is a flow chart of a sub-routine for processing under an extraction rule of a harmonic tone.
Figure 12:
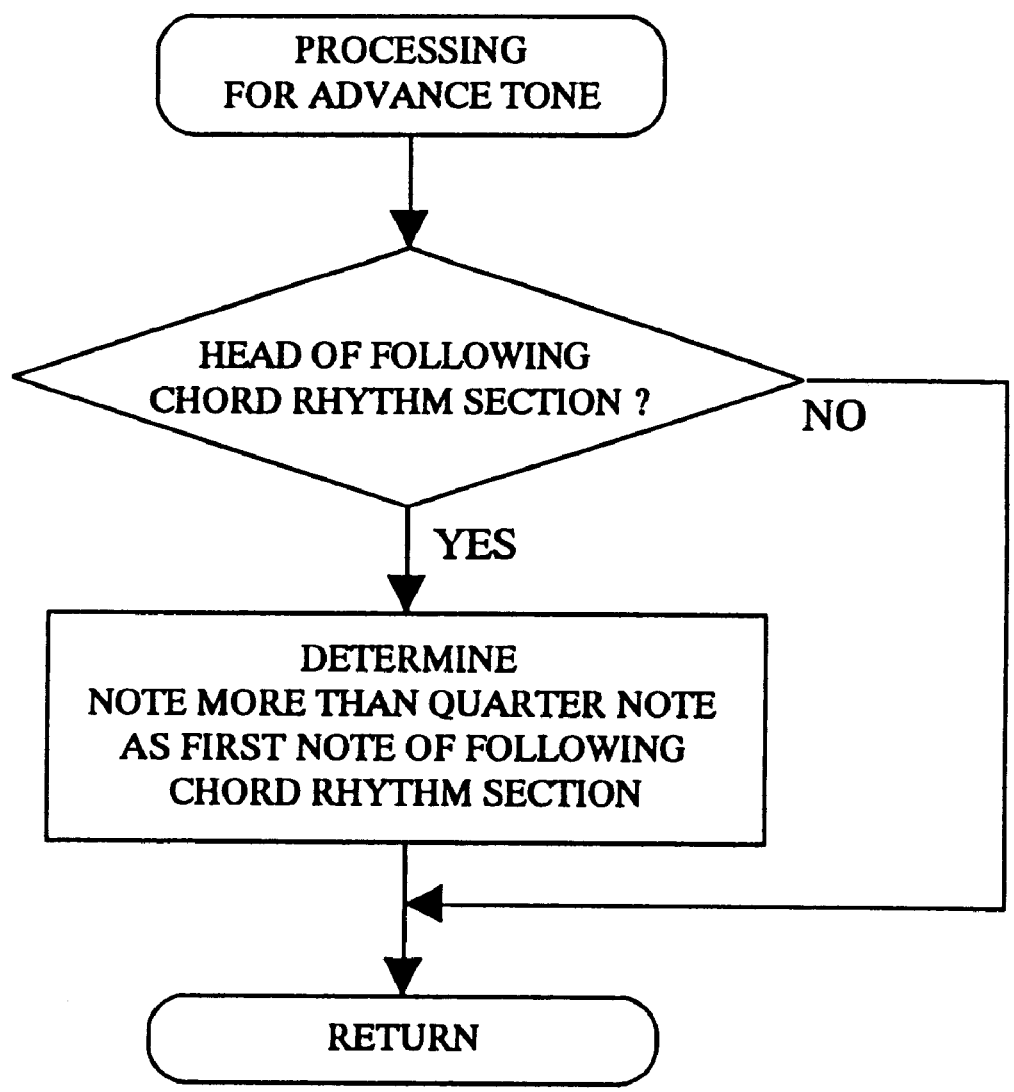
FIG. 12 is a flow chart of a sub-routine for processing of an advance tone.

During the processing for extraction of a harmonic tone shown in FIG. 10 and processing under an extraction rule of a harmonic tone shown in FIG. 11 and processing of an advance tone shown in FIG. 12, each harmonic tone in the chord rhythm sections is extracted from the head of the melody. In the chord rhythm section where any harmonic tone may not be extracted, a harmonic tone is extracted from the end of the melody by processing for re-extraction of a harmonic tone shown in FIG. 13. In this instance, a detection flag is used to determine whether a harmonic tone corresponding with each chord rhythm section has been detected or not. Thus, the detection flag is set as "0" when any harmonic tone has not been detected and is set as "1" when a harmonic tone has been detected.

During the processing for extraction of a harmonic tone shown in FIG. 10, the CPU 1 causes the reading pointer at step S41 to point out a first chord rhythm section and sets at step S42 the detection flag of the pointed chord rhythm section as "0". If at step S43 the head of the pointed chord rhythm section is a rest and a note of the immediately before chord rhythm section is not a harmonic tone, the CPU 1 deletes the rest data and adds the length of the rest to the length of the immediately before note to obtain a tone length data. At the following step S44, the CPU 1 detects an auxiliary tone pattern in which notes of tone pitches "a" and "b" are included in the pointed chord rhythm section in the order of "a-b-a". Even if a rest is placed between "a" and "b" or "b" and "a", the rest is disregarded. When the program proceeds to step S45, the CPU 1 determines whether the auxiliary tone pattern has been detected or not. If the answer at step S45 is "Yes", the CPU 1 determines at step S46 the note of tone pitch "a" as a harmonic tone and determines the note of tone pitch "b" as an auxiliary tone. Subsequently, the CPU 1 retrieves at step S47 whether or not a 3rd degree is included in the note of the pointed chord rhythm section where the tone pitch "a" is defined as a unison. If not, whether or not a 6th degree is included in the note of the pointed chord rhythm section, and if not, whether or not an augmented 4th degree is included in the note of the pointed chord rhythm section. Thus, a tone detected in the foregoing order is determined as a harmonic tone. Thereafter, the CPU 1 determines at step S48 the other notes as other non-harmonic tones, sets at step S49 the detection flag of the pointed chord rhythm section as "1" and causes the program to proceed to step S402.

If as step S45 the auxiliary tone pattern may not be detected, the CPU 1 executes at step S401 the processing under the extraction rule of the harmonic tone to extract a harmonic tone on a basis of an extraction rule other than the auxiliary tone pattern. After finished the processing for the pointed chord rhythm section, the CPU 1 determines at step S402 whether the pointed chord rhythm section is final or not. If the answer at step S402 is "No", the CPU 1 causes the reading pointer at step S403 to point out the following chord rhythm section and causes the program to proceed to step S42. If the answer at step S402 becomes "Yes", the CPU 1 returns the program to the main routine.

During the processing under the extraction rule of the harmonic tone shown in FIG. 11, the CPU 1 determines at step S410 whether the pointed chord rhythm section is comprised of only a rest or not. If the answer at step S410 is "Yes", the CPU 1 returns the program to the main routine. If the answer at step S410 is "No", the CPU 1 determines at step S411 whether the pitch name is one kind or not. If the pitch name is one kind, the CPU 1 determines all the notes as a harmonic tone at step S412 and causes the program to proceed to step S418. If the answer at step S411 is "No", the CPU 1 executes at step S413 the processing for advance tone shown in FIG. 14, wherein a constituent tone of the following chord is advanced as an anticipation note prior to a final time of the preceding chord. At step S420 in FIG. 14, the CPU 1 determines whether or not the head of the following chord rhythm section is a note the length of which is more than a quarter note. If the answer at step S420 is "No", the CPU 1 returns the program to the main routine. If the answer at step S420 is "Yes", the CPU 1 determines at step S421 the note as a first note of the following chord rhythm section and returns the program to the main routine. Thus, the anticipation note is placed in the same chord rhythm section.

After execution of the processing for advance tone, the CPU 1 determines at step S414 in FIG. 11 whether the number of notes in the pointed chord rhythm section is three notes or not. If the answer at step S414 is "Yes", the CPU 1 determines at step S415 two tones of a maximum difference in tone pitch as a harmonic tone and causes the program to proceed to step S418. If the answer at step S414 is "No", the CPU 1 determines at step S416 whether there is a note "1" longer in length than a half of the chord rhythm section or not. If the answer at step S416 is "No", the program returns to the main routine. If the answer at step S416 is "Yes", the CPU 1 determines the note "i" as a harmonic tone at step S417. In this instance, if there is a chord constituent tone other than the chord constituent tone of the note "i", the CPU 1 determines at step S417 the other chord constituent tone as a harmonic tone and causes the program to proceed to step S418. At step S418, the CPU 1 determines other notes as non-harmonic tones and returns the program to the main routine after setting at step S419 the detection flag of the pointed chord rhythm section as "1".

Figure 13:
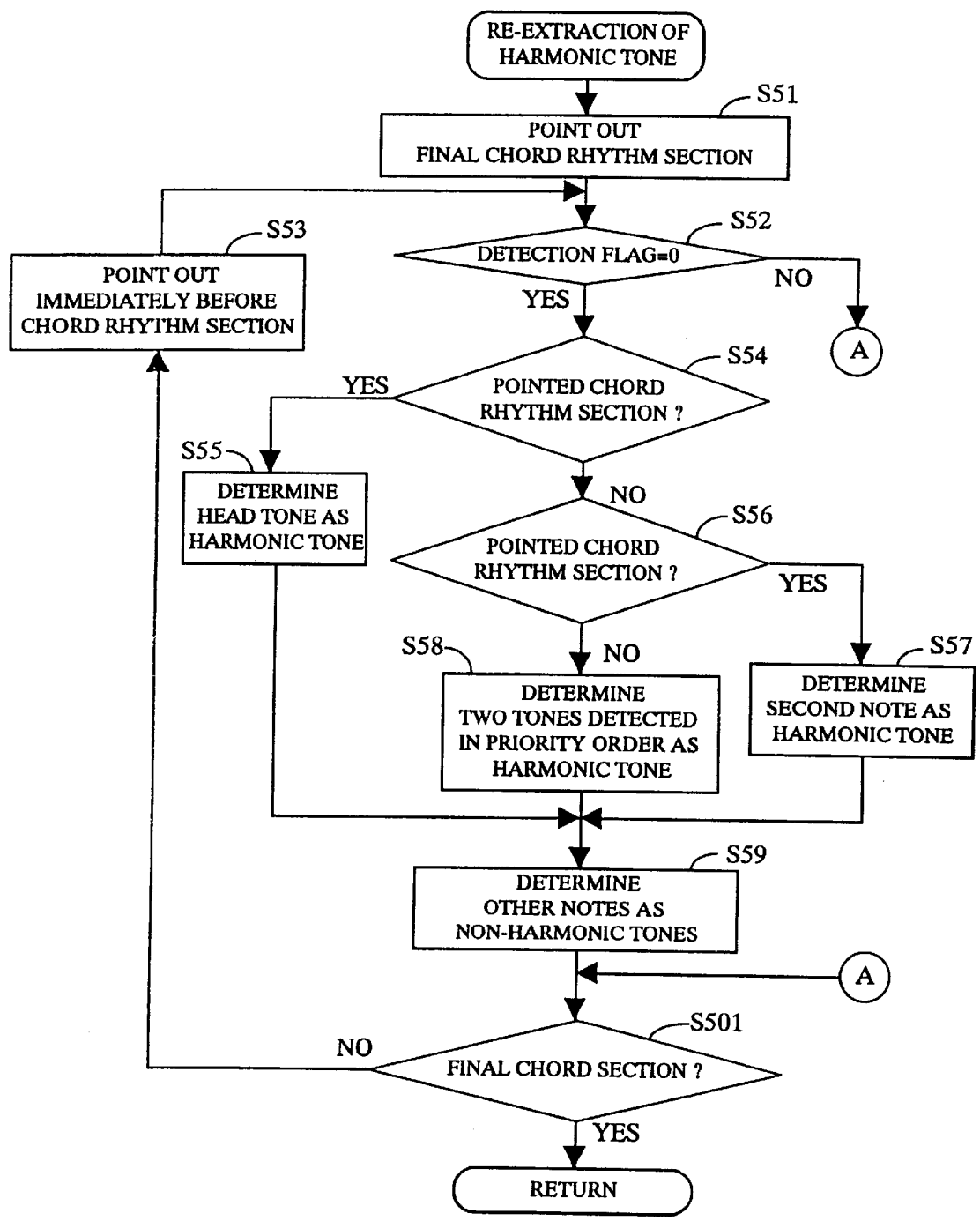
FIG. 13 is a flow chart of a sub-routine for re-extraction of the harmonic tone.

With the processing for extraction of the harmonic tone shown in FIG. 10, the processing under the extraction rule of the harmonic tone shown in FIG. 11 and the processing for the advance tone shown in FIG. 12, the harmonic tone of the chord rhythm section is extracted from the head of the melody, the detection flag of the chord rhythm section from which the harmonic tone was extracted is set as "1", and the detection flag of the chord rhythm section from which the harmonic tone was not extracted is set as "0". Thus, the processing for re-extraction of the harmonic tone shown in FIG. 13 is executed by the CPU 1 to retrieve the melody from its final part thereby to extract a harmonic tone from the chord rhythm section the detection flag of which is being set as "0".

During the processing for re-extraction of the harmonic tone, the CPU 1 causes the reading pointer at step S51 to point out the final chord rhythm section and determines at step S52 whether the detection flag of the pointed chord rhythm section is being set as "0" or not. If a harmonic tone has been detected, the CPU 1 determines a "No" answer at step S52 and causes the program to proceed to step S501. If any harmonic tone has not been detected, the CPU 1 determines a "Yes" answer at step S52 and detects a harmonic tone as follows. At step S54, the CPU 1 determines whether or not the pointed chord rhythm section satisfies the facts that the chord rhythm section is comprised of two tones while the head of the following chord rhythm section is a harmonic tone and that the three tones are in a successive progression in the same direction. If the answer at step S54 is "Yes", the CPU 1 determines at step S55 the head of the three tones as a harmonic tone and causes the program to proceed to step S59.

If the answer at step S54 is "No", the CPU 1 determines at step S56 whether or not the pointed chord rhythm section satisfies the facts that the chord rhythm section is comprised of two tones while the following rhythm section is comprised of one tone. If the answer at step S56 is "Yes", the CPU 1 determines at step S57 the second note as a harmonic tone and causes the program to proceed to step S59. If the answer at step S56 is "No", the CPU 1 determines at step S58 whether the pointed chord rhythm section includes two tones of three degrees in a tone pitch difference or not, if not whether the pointed chord rhythm section includes two tones of the 6th degree in a tone pitch difference or not, and if not whether the pointed chord rhythm section includes two tones of argument 4th degree or not. Thus, the CPU 1 determines the two tones detected in the above order of priority as a harmonic tone. If there are two tones of the same degree more than two pairs, a pair of lower tones is determined as a harmonic tone. The notes are determined as nonharmonic tones at step S59.

After detection of the harmonic tone in one of the chord rhythm sections, the CPU 1 determines at step S501 whether the currently pointed chord rhythm section is the first chord rhythm section or not. If the answer at step S501 is "No", the CPU 1 causes the reading pointer at step S53 to point out the immediately before chord rhythm section and causes the program to proceed to step S52. If the answer at step S501 is "Yes", the CPU 1 returns the program to the main routine.

With the foregoing processing, harmonic tones of the respective chord rhythm sections provisionally divided into one measure or two beats are extracted. In case the chord rhythm sections are provisionally divided in excess for detection of a tonality, the processing for combination of the chord rhythm sections shown in FIG. 14 is executed by the CPU 1 to combine the provisionally divided chord rhythm sections based on harmonic tones included therein.

Figure 14:
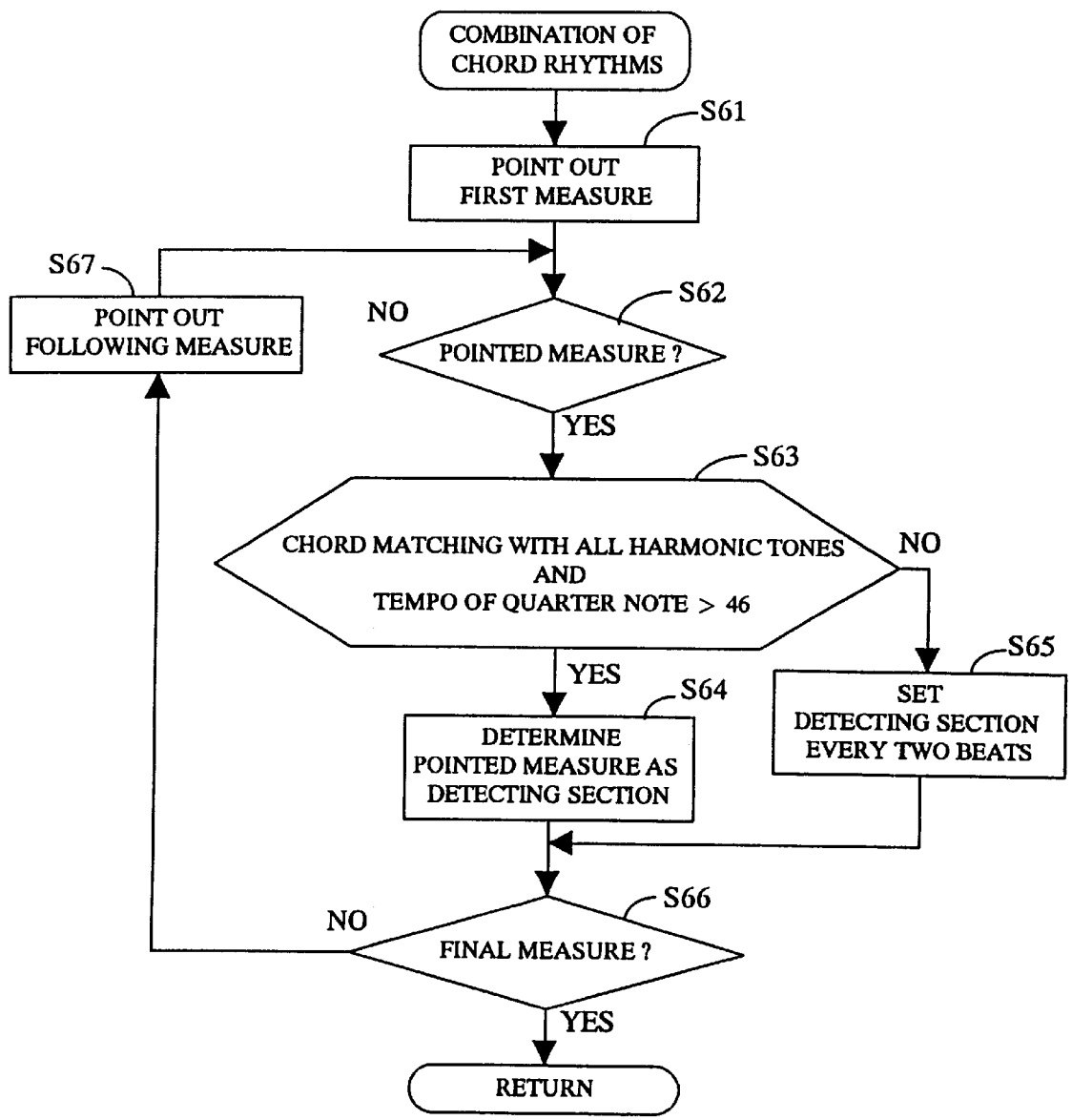
FIG. 14 is a flow chart of a sub-routine for combination of extracted chord rhythm sections.

During the processing for combination of the chord rhythm sections shown in FIG. 14, the CPU 1 causes the reading pointer at step S61 to point out a first measure and determines at step S62 whether the pointed measure has been divided into chord rhythm sections every two beats. If the answer at step S62 is "No", the CPU 1 sets the pointed measure as a detecting section at step S64 and causes the program to proceed to step S66. If the answer at step S62 is "Yes", the CPU 1 determines at step S63 whether the facts that there is a chord of constituent tones matching with all the harmonic tones of the pointed measure and that the current tempo is a quarter note >46 (a tempo over forty six (46) beats in one minute when a quarter note is defined as one beat) are satisfied or not. If the answer at step S63 is "Yes", the CPU 1 sets at step S64 the pointed measure as a detecting section. If the answer at step S63 is "No", the CPU 1 sets at step S65 the detecting section of the pointed measure every two beats. After processing of one of measures, the CPU 1 determines at step S66 whether the pointed measure is a final measure or not. If the answer at step S66 is "No", the CPU 1 causes the reading pointer to point out the following measure and causes the program to proceed to step S62. If the answer at step S66 is "Yes", the CPU 1 returns the program to the main routine. If during the processing for combination of the chord rhythms, the tempo is relatively quick under presence of a chord of constituent tones matching with all the harmonic tones of the pointed measure, a tonality does not change in the measure. For this reason, the chord rhythm section every tow beats is determined as the detecting section of one measure.

Figure 15:
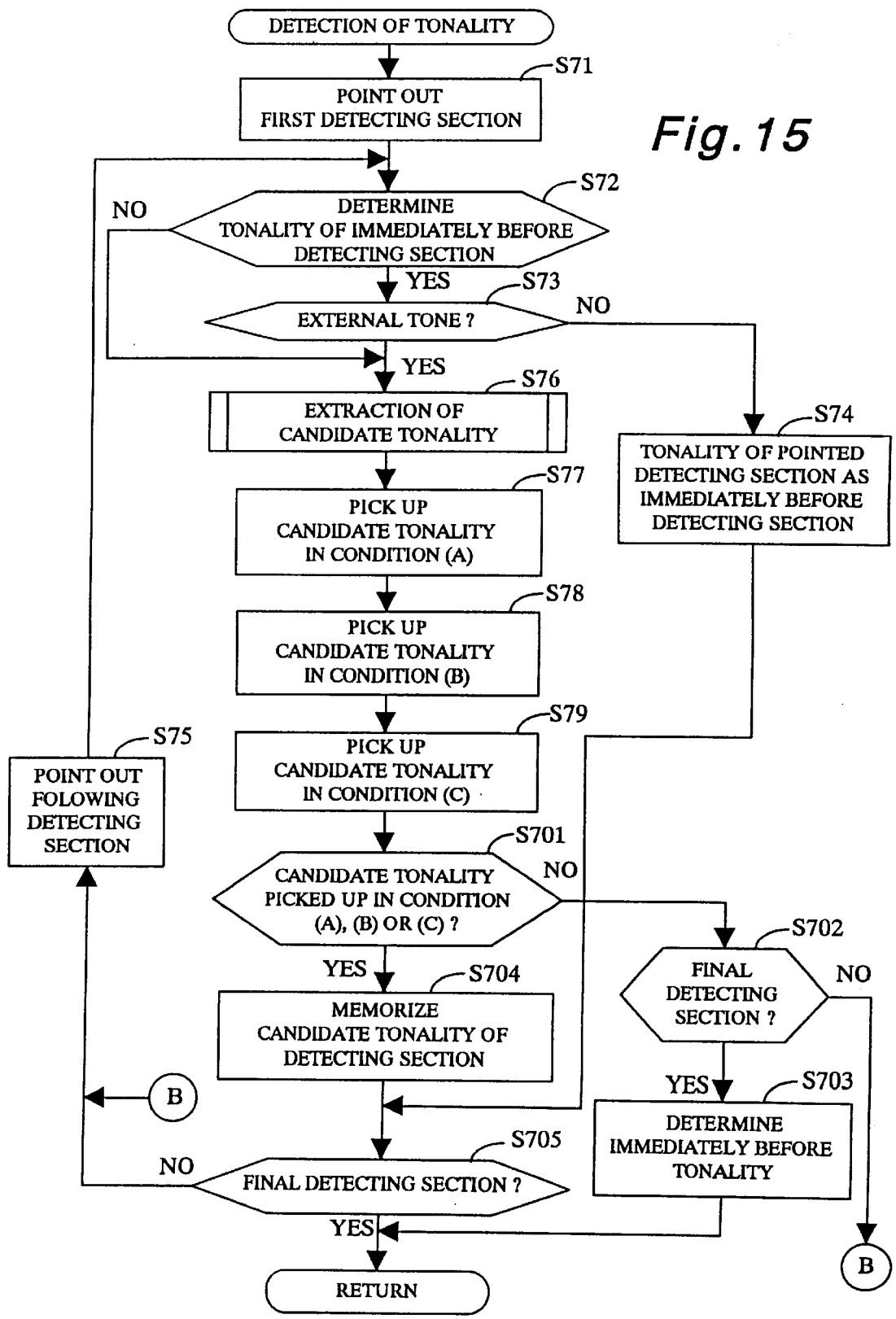
FIG. 15 is a flow chart of a sub-routine for tonality detection.

When the melody data has been divided into one measure or two beats to determine the detecting sections, the CPU 1 executes the processing for detection of a tonality shown in FIG. 15. In this instance, the CPU 1 causes the reading pointer at step S71 to point out the first detecting section and determines at step S72 whether a tonality of the immediately before detecting section has been determined or not. If the answer at step S72 is "No" or the immediately before detecting section does not exist, the CPU 1 executes the processing for extraction of a candidate tonality shown in FIG. 16 and causes the program to proceed to step S77. If the answer at step S72 is "Yes", the CPU 1 determines at step S73 whether an external tone of the determined tonality or a tone without any tonality scale is included in the pointed detecting section or not. If the answer at step S73 is "Yes", the program proceeds to step S76. If the answer at step S73 is "No", the CPU 1 determines at step S74 the tonality of the pointed detecting section as an Immediately before detecting section and causes the program to proceed to step S705.

Figure 16:
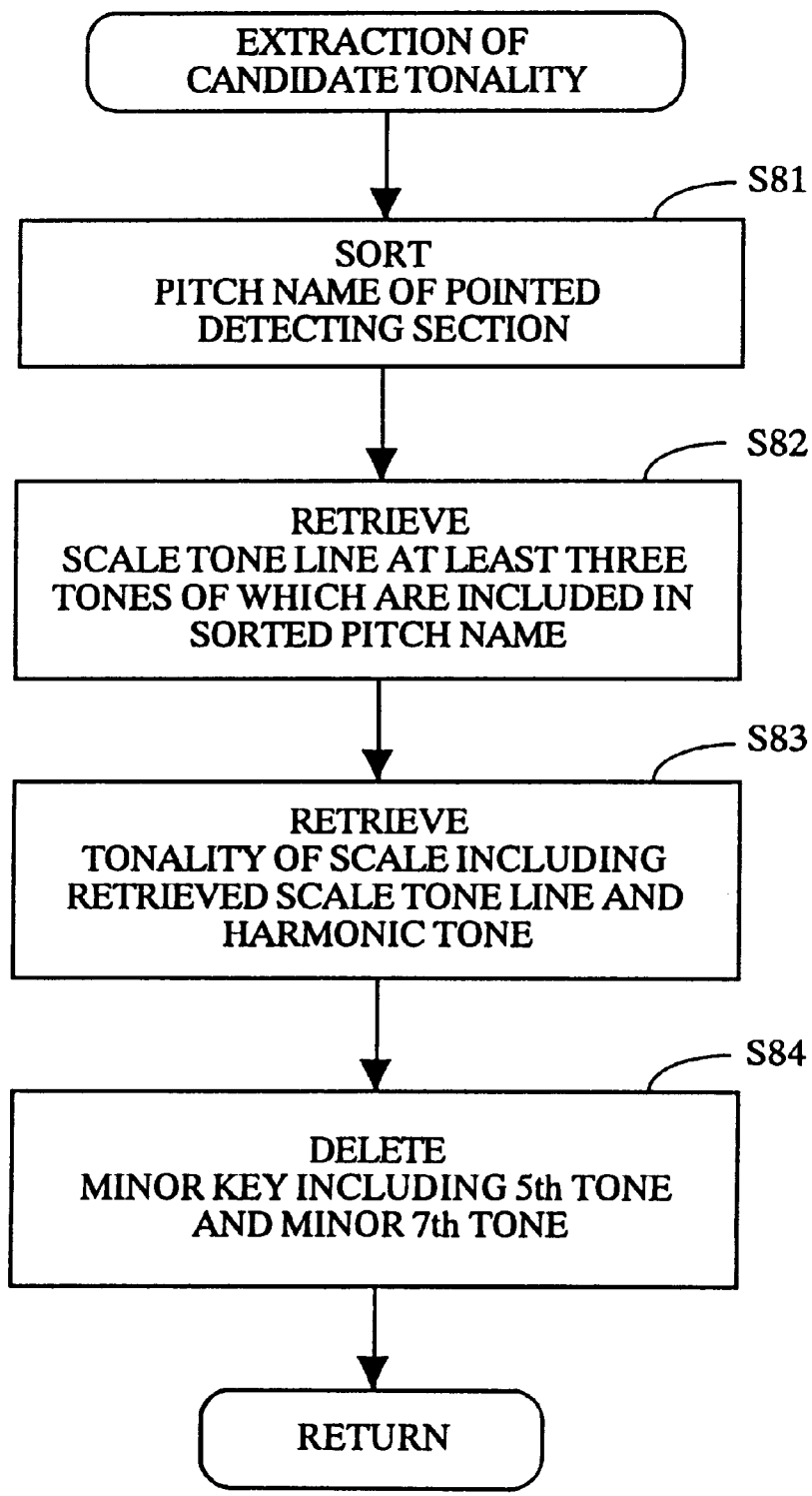
FIG. 16 is a flow chart of a sub-routine for extraction of a candidate tonality.

During the processing for extraction of a candidate tonality shown in FIG. 16, the CPU 1 sorts pitch names of the notes of the pointed detecting section at step S81 and retrieves at step S82 a scale tone line at least the three tones of which are included in the sorted pitch names and listed in the foregoing table 1. If the scale tone line exists, the CPU 1 retrieves at step S83 a tonality of a scale including the retrieved scale tone line and a harmonic tone of the pointed detecting section and memorizes the retrieved tonality as a candidate tonality of the pointed detecting section. Subsequently, the CPU 1 deletes a minor key including a 5th degree and a minor 7th degree of the pointed detecting section from the memorized candidate tonality and returns the program to the main routine. When the candidate tonality is extracted, a tonality in conformity with a predetermined condition is determined by execution of processing at step S77–S704 shown in FIG. 15 as described below.

At step S77, the CPU 1 picks up "a candidate tonality of a major key (maj) with 1st and 7th tones of a key scale from the detecting section the tonality of which has not been determined to the pointed detecting section" in a condition (A). At the following step S78, the CPU 1 picks up "a candidate tonality of a minor key with 1st, 6th and 7th tones of a key scale from the detecting section the tonality of which has not been determined to the pointed detecting section" in a condition (B). Subsequently, the CPU 1 picks up at step S79 "a candidate tonality of a minor key with 1st, 6th and 7th tones of a key scale from the detecting section the tonality of which has not been determined to the pointed detecting section in a condition (C).

Thereafter, the CPU 1 determines at step S701 whether a candidate tonality has been picked up in the conditions (A), (B) or (C) or not. If the answer at step S701 is "No", the CPU 1 determines at step S702 whether the pointed detecting section is the final detecting section or not. If the answer at step S702 is "Yes", the CPU 1 determines at step S703 the tonality determined immediately before as a tonality of from the detecting section the key of which has not been determined to the pointed detecting section and returns the program to the main routine. If the answer at step S702 is "No", the CPU 1 causes the program at step S703 to proceed to step S75 without determine any tonality.

If the answer at step S701 is "Yes", the CPU 1 memorizes at step S704 a candidate tonality of from the detecting section the tonality of which has not been determined to the pointed detecting section as a tonality of the detecting sections and causes the program to proceed to step S705. If plural candidate tonalities have been picked up at step S77, S78 or S79, the CPU 1 determines the same tonality as the tonality of the previous detecting section. When the previous tonality has not been determined, the CPU 1 determines a tonality picked up in the priority order of the conditions (A), (B) and (C).

After processing of one of the detection sections, the CPU 1 determines at step S705 whether the pointed detecting section is a final detecting section or not. If the answer at step S705 is "No", the CPU 1 causes the reading point to point out the following detecting sections and causes the program to proceed to step S72. If the answer at step S705 is "Yes", the CPU 1 returns the program to the main routine.

In such a manner as described above, the melody data is divided into detecting sections of two beats or one measure in accordance with the harmonic tones and the melody pattern, and the candidate tonality is extracted every detecting sections based on the harmonic tones and pitch name lines. Thus, the tonalities are determined on a basis of the candidate tonalities every detecting sections.

Figure 17:
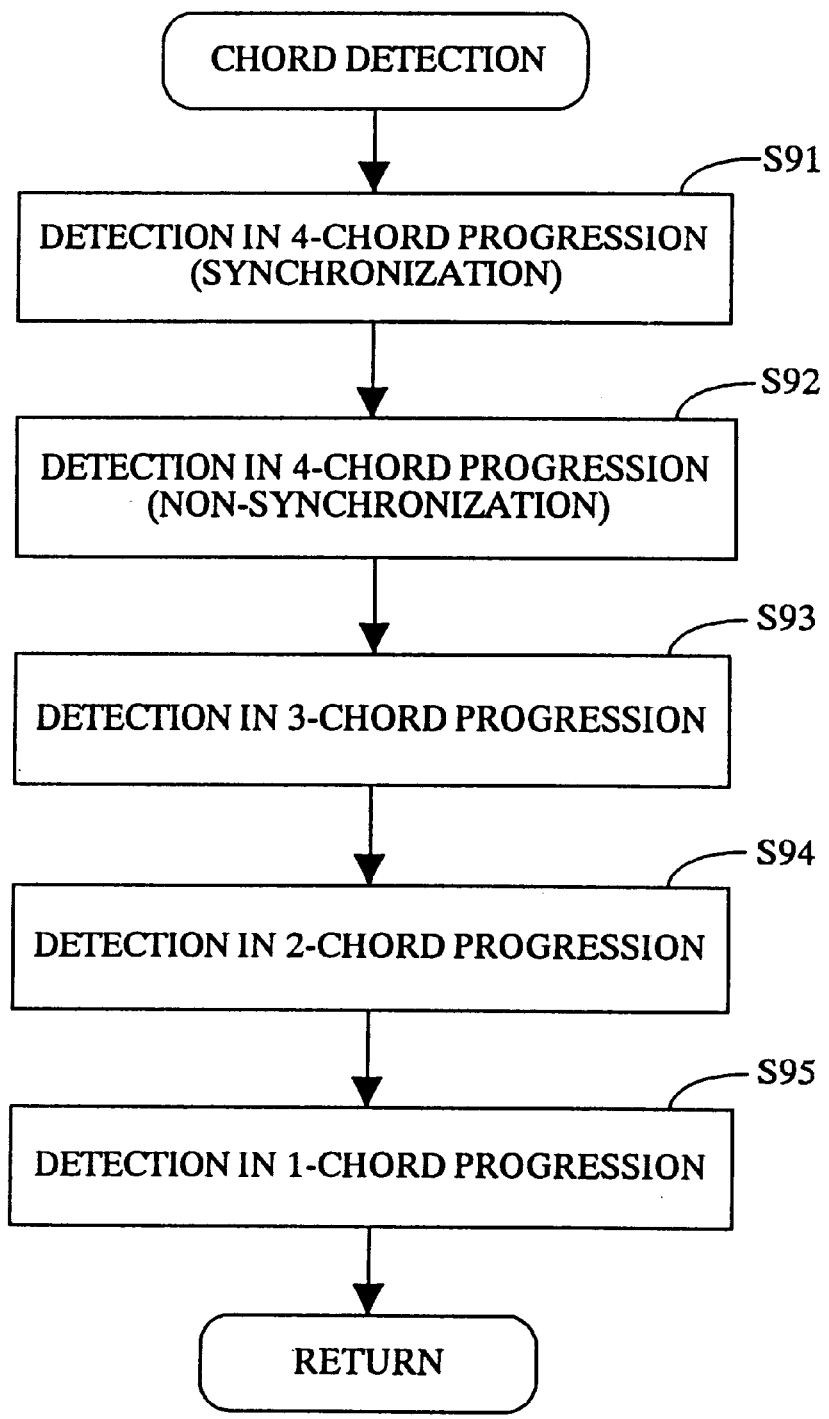
FIG. 17 is a flow chart of a sub-routine for chord detection.

During the processing for detection of the chord shown in FIG. 17, the CPU 1 executes at step S91 processing for detection of a four-chords progression (synchronization). The four-chords progression (synchronization) means a condition where a chord is allotted in such a manner that four measures are continual with respect to one measure. Thus, with respect to a portion where a detecting section (a chord rhythm section) in one measure unit is continual in four measures, the CPU 1 determines whether a four-chords progression (synchronization) corresponding with the detecting section exists in the chord progression data or not. In this instance, the CPU 1 lists up a four-chords progression (synchronization) which satisfies the following two conditions with respect to each of plural four-chords progressions in the chord progression data.

a condition where each harmonic tone of the four detecting sections is included in constituent tones of the corresponding chord.

a condition where one of the four detecting sections corresponds with a chord suitable for the head measure or final measure of the divided phrases.

In such processing as described above, either one of the data bases DB of the major key and minor key is used in accordance with the tonality (a major key or a minor key) determined in the foregoing manner. In use of the data base DB, a chord represented by a degree name can be converted into an effective chord in consideration with a tonic of the tonality. If the four-chord progression satisfying the above conditions is listed up in the plural, the CPU 1 selects one of the four-chords progressions in the order of priority applied thereto. In the conditions described above, the chord suitable for the head measure or final measure of the divided phrases can be determined with reference to a group chords suitable for the head or final measure memorized in the program memory 2.

Assuming that four chords of the four-chord progression corresponding with certain four detecting sections have been determined, the CPU 1 executes processing of the following four detecting sections in the same manner as described above. When the four chords corresponding with the four detecting sections have not been determined, the CPU 1 shifts the four detecting sections rearwardly one by one and executes processing of the previous three detecting sections and the preceding detecting section. When such processing of the detecting sections are repetitively executed, each chord of all the detecting sections is determined.

At step S92, the CPU 1 executes processing for detection of a four-chords sequence (non-synchronization). In this instance, the CPU 1 determines whether a four-chords progression (non-synchronization) corresponding with the detecting section exists in the chord progression data or not. Subsequently, the CPU 1 lists up a four-chords progression (non-synchronization) which satisfies the following two conditions with respect to each of plural four-chords progressions (non-synchronization) in the chord progression data.

a condition where each harmonic tone of the four detecting sections is included in constituent tones of the corresponding chord.

a condition where one of the four detecting sections corresponds with a chord suitable for the head measure or final measure of the divided phrases.

At step S93, the CPU 1 executes processing of a portion where any chord has not been determined and where at least three detecting sections are continual. During the processing at step S93, the CPU 1 causes the three detecting sections to correspond with three chords of the three-chords progression in the chord progression data and determines the three chords of the three-chords progression as the chords of the three detection sections when the harmonic tones of the detecting sections are included in constituent tone of the corresponding chords. If the three-chords progression is plural, the three chords are determined in the order of priority.

At step S94, the CPU 1 executes processing of a portion where any chord has not been determined and where at least two detecting sections are continued. During the processing at step S94, the CPU 1 causes the two detecting sections to correspond with two chords of the two-chords progression in the chord progression data and determines the two chords of the two-chords progression as the chords of the two detecting sections when the harmonic tones of the detecting sections are included in constituent tones of the corresponding chords.

At step S95, the CPU 1 executes processing of a portion where the chords of the four-chords progression, three-chords progression and two-chord progression has not been determined. During the processing at step S95, the CPU 1 selects a chord in the highest order of priority from chords included in constituent tones of chords corresponding with the respective harmonic tones of the detecting sections each tonality of which has not been determined and determines the selected chord as each chord of the detecting sections. Thus, each chord of all the detecting sections is determined.

When the chords are determined in such a manner as described above, the CPU 1 deletes competitive chords of melodies listed in the following table 2, wherein each root of the melodies is represented by "C". The other roots of the competitive chords are represented in the same interval relationship as in the table 2.

TABLE 2

| Melody | | | | | Competitive Chord |
|---|---|---|---|---|---|
| E | ♭ | F# | B | ♭ | Cmaj, Cmaj7 |
| E | ♭ | G | | | Chug |
| E | | F# | B | | Cmin, Cm7 |
| E | | G | B | | Cm♭5, Cm7♭5 |
| E | ♭ | F# | B | | C♭5 |

Although in the above embodiment the CPU 1 determines whether the chords are suitable for the first or final part of the divided phrases or not, the CPU 1 may be programmed to determine whether the chords are suitable for the first or final part of a musical tune. In addition, the chord progression data may be provided in the form of a different data base comprised of various kinds of rhythms, a musical style, a tempo, a meter, etc.

Since in the performance data analyzer according to the present invention a harmonic tone and a pitch name line of a melody data are extracted to detect a tonality from a scale including the extracted harmonic tone and pitch name line, the tonality can be detected in high fidelity to the melody data. In addition, the melody data and its harmonic tone are divided into a plurality of detecting sections of two beats or one measure shorter than the divided phrases in accordance with the melody pattern to detect each tonality of the detecting sections where the tonality is detectable. This is useful to accurately detect the tonality.

Although in the above embodiment each chord rhythm section is divided into two beats or one measure, the split length may be switched over in accordance with a tempo. Alternatively, the chord rhythm section may be divided into predetermined sections such as one measure unit, one beat unit, etc. In a practical embodiment of the present invention, the performance data or melody data may be supplied from an external data source such a MIDI data, a memory media such as a floppy disk, CE-ROM or a communication interface in the form of various networks.

What is claimed is:

1. A performance data analyzer comprising:

input means for inputting a performance data representing a sequence of plural notes;

determination means for determining whether a reference performance pattern of a predetermined length composed of plural notes is included in the input performance data;

division means for dividing the input data performance data into a plurality of sections on a basis of determination, by the determination means, that the reference performance pattern is included in the input performance data; and detection means for analyzing the input performance data each at the divided sections to detect either one of a tonality or a chord of each of the divided sections of the input performance data on a basis of a result of the analysis;

wherein the reference pattern comprises at least one of a trill pattern and a sound timing pattern.

2. A performance data analyzer as claimed in claim 1, wherein said division means comprises means for dividing a portion of the input performance data corresponding with the reference performance pattern as one section when the reference performance pattern is included in the input performance data.

3. A performance data analyzer as claimed claim 1, wherein said division means comprises means for determining a section to be divided on a basis of the number of notes included in a predetermined section of the input performance data or presence of a predetermined length note in the input performance data when the reference performance pattern is not included in the input performance data.

4. A method of analyzing performance data comprising the steps of:

inputting a performance data representing a sequence of plural notes;

determining whether a reference performance pattern of a predetermined length composed of plural notes is included in the input performance data;

dividing the input data performance data into a plurality of sections on a basis of determination that the reference performance pattern is included in the input performance data; and analyzing the input performance data each at the divided sections to detect either one of a tonality or a chord of each of the divided sections of the input performance data on a basis of a result of the analysis;

wherein the reference pattern comprises at least one of a trill pattern and a sound timing pattern.

5. A method as claimed in claim 4, wherein said step of dividing includes dividing a portion of the input performance data corresponding with the reference performance pattern as one section when the reference performance pattern is included in the input performance data.

6. A method as claimed in claim 4, wherein said step of dividing comprises determining a section to be divided on a basis of the number of notes included in a predetermined section of the input performance data or presence of a predetermined length note in the input performance data when the reference performance pattern is not included in the input performance data.

7. A method as claimed in claim 4, wherein said step of detecting includes detecting each harmonic tone included in the divided sections and detecting each tonality or chord of the divided sections based on the detected harmonic tone.

8. A machine readable medium for use in a performance data analyzer, said medium including executable program instructions for causing said performance data analyzer to perform the steps of:

inputting a performance data representing a sequence of plural notes;

determining whether a reference performance pattern of a predetermined length composed of plural notes is included in the input performance data;

dividing the input data performance data into a plurality of sections on a basis of determination that the reference performance pattern is included in the input performance data; and analyzing the input performance data each at the divided sections to detect either one of a tonality or a chord of each of the divided sections of the input performance data on a basis of a result of the analysis;

wherein the reference pattern comprises at least one of a trill pattern and a sound timing pattern.

9. A machine readable medium as claimed in claim 8, wherein said step of dividing includes dividing a portion of the input performance data corresponding with the reference performance pattern as one section when the reference performance pattern is included in the input performance data.

10. A machine readable medium as claimed in claim 8, wherein said step of dividing comprises determining a section to be divided on a basis of the number of notes included in a predetermined section of the input performance data or presence of a predetermined length note in the input performance data when the reference performance pattern is not included in the input performance data.

11. A machine readable medium as claimed in claim 8, wherein said step of detecting includes detecting each harmonic tone included in the divided sections and detecting each tonality or chord of the divided sections based on the detected harmonic tone.

12. A performance data analyzer comprising:

a performance data input device;

a memory unit that stores a performance data representing a sequence of plural notes coupled to the performance data input device; and a control processor coupled to the memory unit, wherein the control processor determines whether a reference performance pattern of a predetermined length composed of plural notes is included in the input performance data, divides the input data performance data into a plurality of sections on a basis of determination that the reference performance pattern is included in the input performance data, and analyzes the input performance data each at the divided sections to detect either one of a tonality or a chord of each of the divided sections of the input performance data on a basis of a result of the analysis;

wherein the reference pattern comprises at least one of a trill pattern and a sound timing pattern.

13. A performance data analyzer as claimed in 12, wherein the control processor divides a portion of the input performance data corresponding with the reference performance pattern as one section when the reference performance pattern is included in the input performance data.

14. A performance data analyzer as claimed in claim 13, wherein the control processor determines a section to be divided on a basis of the number of notes included in a predetermined section of the input performance data or presence of a predetermined length note in the input performance data when the reference performance pattern is not included in the input performance data.

15. A method as claimed in claim 12, wherein the control processor detects each harmonic tone included in the divided sections and detecting each tonality or chord of the divided sections based on the detected harmonic tone.

* * * * *